United States Patent
Abershitz

(10) Patent No.: US 11,483,355 B1
(45) Date of Patent: Oct. 25, 2022

(54) SYSTEM AND METHODS FOR AGENTLESS MANAGED DEVICE IDENTIFICATION AS PART OF SETTING A SECURITY POLICY FOR A DEVICE

(71) Applicant: Proofpoint, Inc., Sunnyvale, CA (US)

(72) Inventor: Amit Abershitz, Ramat Hasharon (IL)

(73) Assignee: Proofpoint, Inc., Sunnyvale, CA (US)

( * ) Notice: Subject to any disclaimer, the term of this patent is extended or adjusted under 35 U.S.C. 154(b) by 44 days.

(21) Appl. No.: 17/122,552

(22) Filed: Dec. 15, 2020

(51) Int. Cl.
*H04L 9/40* (2022.01)
*H04L 9/32* (2006.01)

(52) U.S. Cl.
CPC .......... *H04L 63/205* (2013.01); *H04L 9/3268* (2013.01); *H04L 63/0884* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 2016/0344736 | A1* | 11/2016 | Khait | H04L 63/102 |
| 2016/0366120 | A1* | 12/2016 | Rykowski | H04L 63/0815 |
| 2018/0145968 | A1* | 5/2018 | Rykowski | G06F 21/46 |
| 2020/0128020 | A1* | 4/2020 | Abduljaber | H04L 63/10 |
| 2022/0006800 | A1* | 1/2022 | Duchastel | H04L 63/0807 |
| 2022/0022035 | A1* | 1/2022 | Sampson | H04W 4/80 |

FOREIGN PATENT DOCUMENTS

EP         3251324 A1 * 12/2017 ............ G06F 21/33

* cited by examiner

*Primary Examiner* — Arezoo Sherkat
(74) *Attorney, Agent, or Firm* — FisherBroyles LLP; Alan D. Minsk

(57) ABSTRACT

Systems, methods, and apparatuses directed to efficiently determining whether a device making a request to access an application or service is a managed device and using that information to set an appropriate security policy for the device or the request to access the application or service. In some embodiments, a service or server (referred to as a Managed Device Identification Service) is configured to request a client certificate from a device that is requesting access to a cloud-based application or service as part of a protocol handshake. If a certificate is received, it is compared to a stored certificate to determine if the device is a managed device and as a result, the appropriate security policy.

25 Claims, 8 Drawing Sheets

SYSTEM AND METHODS FOR AGENTLESS MANAGED DEVICE IDENTIFICATION AS PART OF SETTING A SECURITY POLICY FOR A DEVICE

BACKGROUND

Cybersecurity (also sometimes referred to as computer security or information technology (IT) security) relates to the protection of computer systems and networks from the theft of, or damage to, hardware, software, or electronic data, as well as from the disruption or misdirection of the services they provide. The data may include proprietary information, payment information, or personal information, and may be of interest to foreign state actors, competitors, or those seeking to commit fraud via identify theft.

One aspect of cybersecurity efforts is that of the prevention of cybersecurity attacks or data breaches associated with devices, particularly mobile devices such as smartphones, tablet computers, and laptop computers. These types of devices may introduce an additional element of risk or exposure to risk because they may be the personal device of an employee and the employee may use the device for both personal and work-related tasks. In other cases, a company or organization may provide an employee with a device to use for work-related tasks.

In the case of either a personal device used for work, or a device issued by a company, the company IT department may require that the user comply with specific security measures or practices. These practices may include use of multi-factor authorization (MFA) to access specific websites, applications, or data sources. Such practices may also include allowing specific websites, blocking specific websites, or disallowing specific websites (e.g., black-listing or gray-listing specific websites), restricting functionality of webpages or applications, limiting access to company networks or systems from certain locations or over certain types of networks, etc.

A security practice for a device, also referred to as a security policy, may include a definition of allowed or prohibited activities or actions. The activities or actions may be defined by a set of characteristics or values for a set of factors that determine the policy. These factors may include, for example, a time of day, a location of the device, a type of device, a type of network being used to access a webpage or application, a role of the person using the device, etc.

An IT department or other party responsible for enforcing cybersecurity policies may set a policy for a specific device and/or user based on a combination of certain values for the characteristics or factors. One of these characteristics or factors may be that the device is a managed device, where a managed device is one belonging to or the use of which is controlled by a company. For example, a managed device may be one issued by a company to a user and that is intended to be used only for work activities. Whether a device is a managed device or not may impact the security policy because such a device may be subject to specific constraints or allowed to access certain applications or data storage, whereas a device that is not managed may be prevented from accessing those applications or data stores.

Thus, to apply an appropriate security policy, it may be necessary to know if a device in question is one that is managed by the company or is instead a personal, unmanaged device that is not used strictly for work activities. Thus, one aspect of implementing a cybersecurity or risk prevention program is being able to identify devices that are supposed to be managed by a company's IT department and those that are not. In response to this determination or identification, a managed device may be subjected to a specific security policy or set of constraints, restrictions, or allowed activities that differ from those applied to a device that is not managed. Because of the importance of reducing cybersecurity risk to an organization from devices that are used in ways that could endanger a company's systems and data, managed device identification is an important factor in determining the appropriate security policy to apply to a device. In some examples, the policy may allow or prevent access to specific applications, servers, data, networks, functions, etc. In contrast, an unmanaged device may not be permitted to access these applications, servers, data, or networks.

Conventional approaches to identifying managed as opposed to unmanaged personal devices typically rely on a client-side application or agent (a forward proxy, browser extension, or other form of agent) installed on the device. The application or agent is responsible for assisting in the implementation of a desired security policy by informing an authentication server or service that the device is to be considered a managed device for purposes of controlling the ability of the device to access certain destinations (e.g., servers, applications, services, etc.) or applying other conditions related to a security policy.

However, the use of an agent installed on a device has certain disadvantages. The agent approach consumes system resources, requires IT resources for maintenance, and an ongoing development effort to support an increasing number of host devices and operating systems. In addition, updates to software on the device may cause conflicts with the installed agent (or vice-versa), resulting in greater demands on IT support and a reduction in the productivity of users. Further, agent-based implementation of a security policy limits the ability of a company to dynamically change policy parameters and factors as more is learned about cybersecurity threats and factors that contribute to successful cybersecurity attacks. This can result in delays in responding to new threats as agent updates are provided and installed, with a risk of a successful attack during the updating period.

Thus, systems and methods are needed for more efficiently and effectively responding to the increase in the number of client-side devices being used and the need to differentiate managed from unmanaged (personal) devices as part of determining the appropriate security policy to apply to a device. Embodiments of the invention are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

Embodiments of the disclosure are directed to systems, apparatuses, and methods for more efficiently identifying the security policy to apply to a device. In some embodiments, a factor used in determining the appropriate security policy is whether a device is a managed device, where a managed device refers to one issued and/or controlled by a company and that may be intended to be used strictly for company approved activities.

Managed devices may include but are not limited to smartphones, tablets, and laptop computers. Managed devices may be subject to a security policy that permits the user to access specific servers, databases, applications or services, while unmanaged devices may be prevented from accessing such destinations. Further, a managed device may be allowed access subject to other constraints or limitations, such as those depending upon time of day, location, user role or function, if access is over a secure network, if traffic over a network is encrypted, etc.

In some embodiments, a device sends a request to a server to access an application or service. In some examples, this may be in the form of a request to login to the application or service. The application or service may be accessed through a remote (or host) server with the request being sent to a specific URL. The request is received by a server at the "address" corresponding to the URL and is redirected to an authentication service/server, termed an Adaptive Access Control Service (AACS) herein. The redirection is typically performed as a result of a configuration by the company that owns or is responsible for the device, where the company or device owner has previously informed the server hosting the requested application or service that requests sent from the company domain are to be redirected to a specific authentication service. The redirection may be performed in accordance with the SAML (security assertion markup language) protocol and may include the host server sending a message to the device to contact the authentication server.

In response, the device contacts the Adaptive Access Control Service. The Adaptive Access Control Service identifies and collects data regarding the user who made the request and data regarding the request. This data may include, but is not limited to or required to include data such as the User ID (e.g., email address, name), Present User Location, Device IP Address, Cloud Service that received request, Time of Day, etc. In some embodiments, the Adaptive Access Control Service sends a request to a Managed Device Identification Service (MDIS) to determine if the device is a managed device. As mentioned, this information is used as part of determining the appropriate security policy to apply to the original request from the device.

The request from the Adaptive Access Control Service to the MDIS includes a unique identification that is associated with the attempt to access the application or service by the device. The unique identification may be provided by any suitable method, including but not limited to an embedded Iframe, an XHR (XMLHttpRequest), or a Redirect operation. The Managed Device Identification Service may utilize Transport Layer Security (TLS), and as part of the TLS protocol handshake, the MDIS requests a certificate from the device, where the certificate is associated with a specific certificate authority (CA).

If the device has a certificate signed by the specified CA, then the device browser provides the signed certificate to the MDIS. If the client does not have such a certificate, it ignores the request. If the MDIS does not receive a response to the request for the certificate, it sends a message to the AACS that includes the unique ID associated with the login or access attempt and indicating that the device is not a managed device.

If the device does have a certificate signed by the specified CA, then it is provided to the MDIS for evaluation. The MDIS compares the received certificate and determines if it matches a previously stored certificate for the device. If the certificate received from the device matches the previously stored certificate, then the MDIS sends a message to the AACS that includes the unique ID associated with the login or access attempt and indicating that the device is a managed device. If the received certificate does not match the previously stored certificate, then the MDIS sends a message to the AACS that includes the unique ID associated with the login or access attempt and indicating that the device is not a managed device.

The AACS is now in possession of information indicating whether the device is a managed device, as well as information regarding the user, the requested access, the user's location, etc. Together, this information is used to determine the appropriate security policy to apply to the request to access the application or service. For example, the policy may permit access to the requested application or service, it may allow access subject to certain restrictions or it may block access to the application or service by the device. Examples of possible restrictions that could be applied in a situation where access is permitted, but subject to a limitation include, but are not limited to preventing downloads, preventing uploads, and blocking access to specific features (e.g., in an HR system, blocking access to payroll information).

The authentication service (AACS) may then provide the device with a token, where the token is then presented by the device to the host server. The token may provide access to the application or service hosted by the server, it may prevent access to the service or application, or it may cause the device to be redirected to a service that provides restricted access to the requested application or service. If the security policy applied to the device request is one that allows access to the application or service, then the server that received the initial request creates a session for the user and launches the application or otherwise provides the service.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1A:
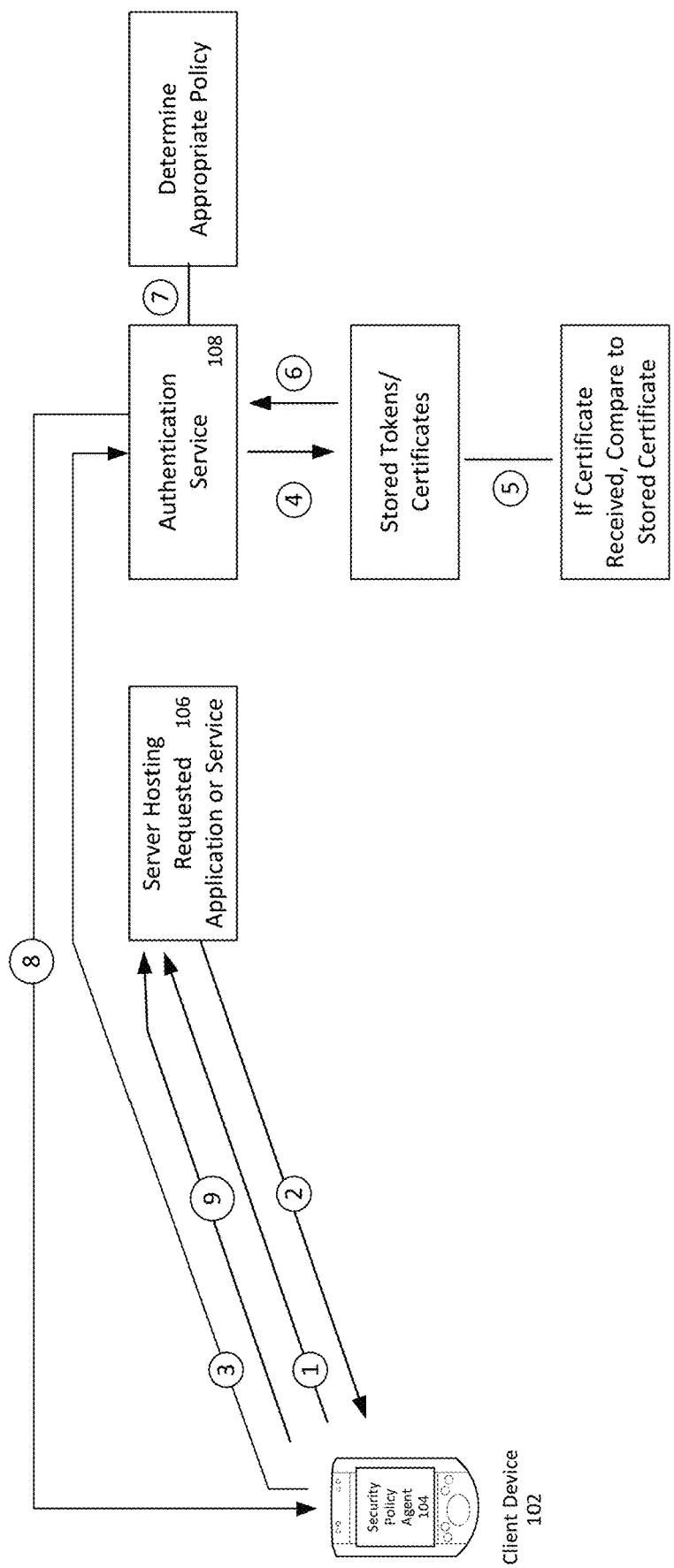
FIG. 1A is a diagram illustrating the elements and process flow involved in a conventional process to determine an appropriate security policy to apply to a device using a software agent installed on the device.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the invention will be described more fully herein with reference to the accompanying drawings, which form a part hereof, and which show, by way of illustration, exemplary embodiments by which the invention may be practiced. The invention may, however, be embodied in different forms and should not be construed as limited to the embodiments set forth herein; rather, these embodiments are provided so that this disclosure will satisfy the statutory requirements and convey the scope of the invention to those skilled in the art.

Among other things, embodiments of the disclosure may be implemented in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), or other form of computing or data processing system, device, or platform.

The processing element or elements may be programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or any other suitable form. The following detailed description is, therefore, not to be taken in a limiting sense.

As mentioned, embodiments of the disclosure are directed to systems, apparatuses, and methods for efficiently determining whether a device making a request to access an application or service is a managed device and using that information to set an appropriate security policy for the device or the request to access the application or service. In some embodiments, a service or server (referred to as a Managed Device Identification Service herein) is configured to request a client certificate from a device that is requesting access to a cloud-based application or service.

The requested certificate is from a specific certificate authority (CA) and if it is provided to the Managed Device Identification Service by the device, then the certificate is compared to a previously stored certificate for the device. In some embodiments, the previously stored certificate is provided to the Managed Device Identification Service by the employer of the user or other owner or manager of the device. If the certificate received from the device is a valid one (that is, it matches the stored certificate), then the Managed Device Identification Service sends a message to an authentication or access control server or service (referred to as an Adaptive Access Control Service herein) containing a unique identifier for the device/request and an indication that the device is a managed device. If the certificate received from the device is not a valid one (that is, it does not match the stored certificate), then the Managed Device Identification Service sends a message to the Adaptive Access Control Service containing a unique identifier for the device/request and an indication that the device is not a managed device. Further, if the Managed Device Identification Service does not receive a response to its request to the device for the certificate, then the Managed Device Identification Service sends a message to the Adaptive Access Control Service containing a unique identifier for the device/request and an indication that the device is not a managed device.

In some embodiments, based at least in part on the message received by the Adaptive Access Control Service from the Managed Device Identification Service and other information about the device, user, or request, the Adaptive Access Control Service determines an appropriate security policy to apply to the device/request. This policy is typically one of (a) permitting the device to access the requested service or application, (b) denial of the device request to access the requested service or application, or (c) redirecting the device to a different service that may provide limited or otherwise constrained access to the requested service or application (or in some cases, access to a different application or service). In some embodiments, the security policy may be represented by a token provided by the authentication service/server (the AACS) to the device. The token is then either presented to the server hosting the requested application or service, or to another server that controls the implementation of the security policy for a managed device.

As mentioned, the security policy may be one that blocks access by the device to the requested application or service, allows access to the requested application or service, or allows access subject to a condition or constraint. In some embodiments, a device being a managed device may mean that certain types of access are allowed, while not being a managed device means that those types of access are not permitted. This may be a result of certain security actions or protocols taken with regards to a managed device, such as multi-factor authentication (MFA), a particular form of encryption, etc.

Note that while the process for determining whether a device is a managed device and as a result setting the appropriate security policy is described herein with reference to a request to access a particular network-based website, application or service, the methodology is not limited to this use case or context. As will be recognized by those of skill in the art, the approach of requesting a certificate from the client device for comparison to a stored certificate may be used to determine the appropriate security policy for a device or user seeking to access an application, service, website, or almost any type of application or service functionality in an agentless manner. Almost any cloud-based security product, service or application that includes the functionality of determining and applying a security policy for a device or user may incorporate the methods described herein. For example, a VPN-like product that is used to control access to suspicious web sites, entering/uploading data to sites, etc., may incorporate the methods described herein to apply a desired security policy without use of an agent.

As used herein, the term or phrase "security policy" refers to a rule, a set of permitted or prevented functions or behaviors, or a definition of allowed, not allowed, or conditioned functions or behaviors that a device or user may engage in. A security policy is typically used to define what a user or device may do with regards to accessing systems, devices, applications, or services and may depend on one or more of the device type, the user's role, the requested service or application, the location, the network or connection method used to make the request, the time of day, or other factor that may influence when access is permitted or not permitted.

FIG. 1A is a diagram illustrating the elements and process flow involved in a conventional process to determine an appropriate security policy to apply to a device using a software agent installed on the device. As shown in the figure, in a conventional approach, a client device 102 includes a security policy agent 104. Security policy agent 104 may take the form of an application or browser plug-in for example. When a user of device 102 wishes to access an application or service hosted by a server 106, the user either launches an application by selecting an icon or sends a request to a specific URL using a browser. The request may be to access a webpage for purposes of a login, for example. In either case, the device 102 generates and sends a request for access to an application or service (as suggested by event or message (1) in the figure) that is transmitted over a network to host server 106. Host server 106 has been configured by the company that is responsible for device 102 to redirect requests received from the company's domain to an authentication service/server. This redirect is implemented by the response (2) that server 106 sends in reply to the request (1) from device 102. Response (2) redirects device 102 to authentication service 108 (as suggested by (3) in the figure). Security policy agent 104 includes a token, certificate or other indication of whether device 102 is a managed device in the redirected request (3). If Authentication Service 108 receives a token or certificate, it is compared to a set of stored tokens/certificates that indicate managed devices (as suggested by (4) and (5)). The result of the comparison (i.e., if the received token or certificate is valid or not) is communicated to the authentication service 108 (as suggested by (6)). Based on whether device 102 is a managed device or not, authentication service 108 determines the appropriate security policy (as suggested by (7)). Authentication service 108 then provides device 102 with a token, URL, or other indicator of whether device 102 is authorized to access the requested application or service (as suggested by (8)). Device 102 presents the token to host server 106 (as suggested by (9)); the token may provide direct access to the requested application or service, prevent access, or may result in the device request being redirected to a service that provides restricted or constrained access to the requested application or service.

Figure 1B:
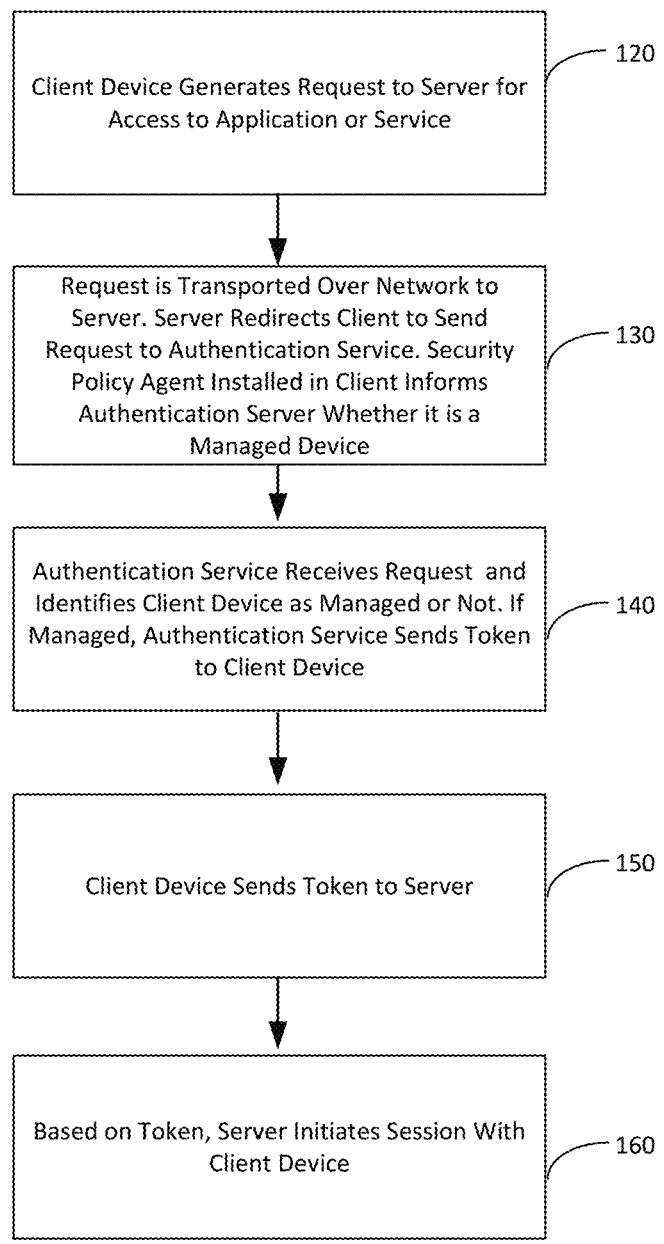
FIG. 1B is a flowchart or flow diagram illustrating the conventional process for determining the security policy to apply to a device using a software agent installed on the device as shown in FIG. 1A.

FIG. 1B is a flowchart or flow diagram illustrating the conventional process for determining the security policy to apply to a device using a software agent installed on the device as shown in FIG. 1A. As shown in the figure, at step or stage 120 a client device generates a request to a server to access an application or service. The request may be generated by an application installed on the client device or by a browser sending a request to a specific URL. At step or stage 130, the request is transported to the server and processed to generate a response. In accordance with the company responsible for the device (such as the user's employer), the server may have been configured to (re)direct the device to send the request to an authentication service/server. The device receives the redirect message from the server and a security policy agent installed in the device sends the request to the authentication service and informs the authentication service whether or not it is a managed device (typically by including a certificate or token). The authentication service receives the request and may compare the certificate or token to a set of previously stored data to verify if the device is a managed device. If the device is a managed device, this is taken into consideration when evaluating the security policy and determining if access should be granted. The authentication service/server sends a "key" or token back to the device (as suggested by step or stage 140). The device receives the key/token and presents it to the server hosting the requested application or service (as suggested by step or stage 150). Upon receipt of the key/token, the host server may initiate a session with the device (as suggested by step or stage 160), block access or otherwise apply the security policy.

Figure 2:
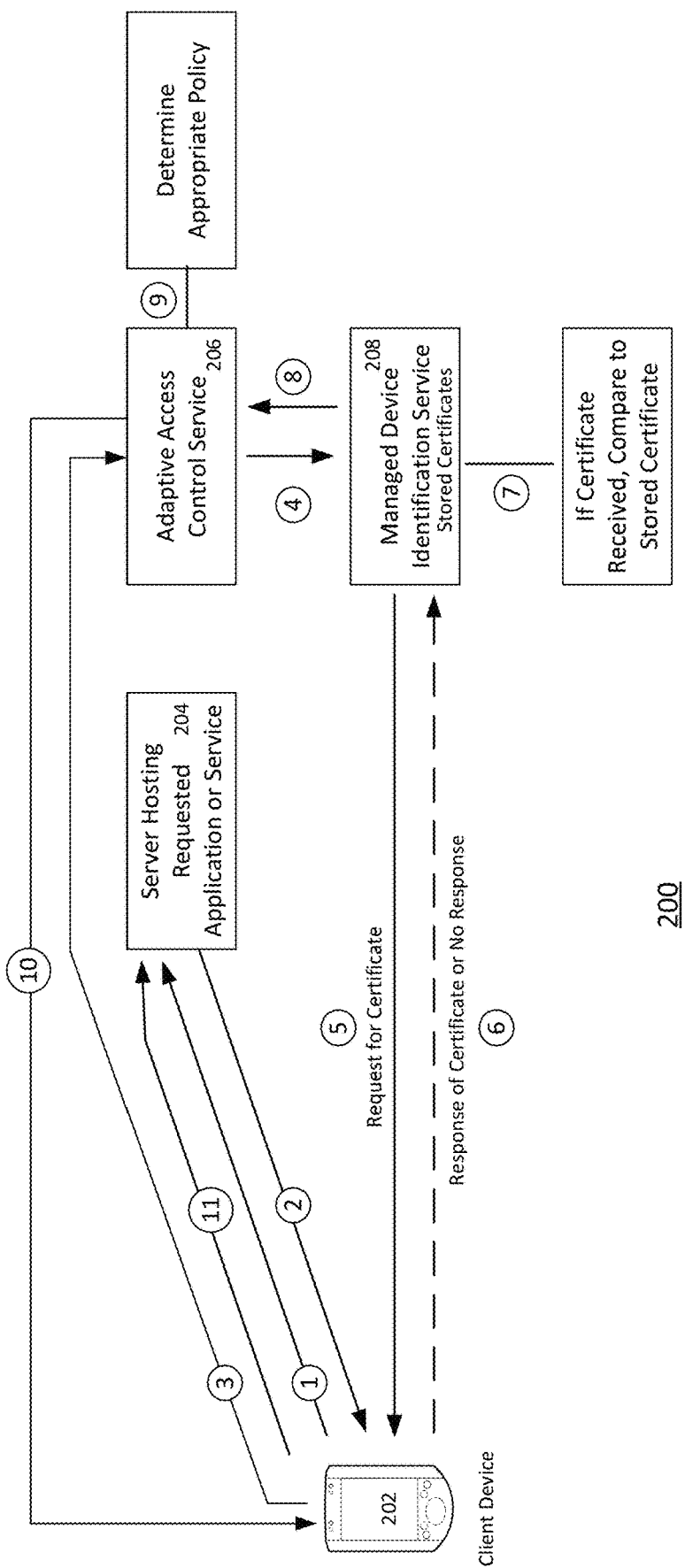
FIG. 2 is a diagram illustrating a process flow for the devices, servers and services that may be part of a system for determining the appropriate security to apply to a request to access an application or service, based at least in part on whether a client device making the request is a managed device, in accordance with some embodiments of the system and methods described herein.

FIG. 2 is a diagram illustrating a process flow 200 for the devices, servers and services that may be part of a system for determining the appropriate security to apply to a request to access an application or service, based at least in part on whether a client device making the request is a managed device, in accordance with some embodiments of the system and methods described herein. As shown in the figure, in some embodiments the following events and exchange of messages may occur:

1. A client device 202 sends a request (as suggested by event or message 1 in the figure) to a server 204 hosting a desired application or service;
2. Server 204 receives and processes the request—this includes determining whether to instruct device 202 to redirect the request (as suggested by event or message 2) as part of an authentication process to the Adaptive Access Control Service (AACS) 206. This determination may be based on the domain of the sender of the request, for example. The redirect may be part of a security or authentication protocol configured at the request of the company responsible for device 202, for example the security assertion markup language (SAML) protocol;
3. For requests redirected to AACS 206 (as suggested by event or message (3)), the AACS collects information regarding the request, user, and device and sends the request and the collected information (as suggested by event or message 4) to a Managed Device Identification Server (MDIS) 208. The collected information may include, for example, user and request specific data such as user ID, user/device location, IP address, cloud service to which the request is directed, time of day, etc. The MDIS stores a set of certificates, with each signed by a specific certificate authority (CA). Each certificate may be associated with one or more aspects (such as the devices involved, the access limitations, etc.) of a security policy;

4. MDIS 208 sends a request (as suggested by event or message 5) to device 202 for a certificate signed by a specific CA. Device 202 either returns a certificate if it has one, or does not respond to the request (as suggested by the dashed line (6));

5. If device 202 sends a certificate, then MDIS 208 receives the certificate and compares it to the stored certificates (as suggested by event or process (7));

6. Based on the results of the comparison, MDIS 208 provides a message to AACS 206 (as suggested by event or message 8), where the message indicates if device 202 is a managed device by virtue of having provided the correct certificate, or is not a managed device by virtue of not providing a certificate or providing an incorrect certificate;

7. Based on the message (8) provided by MDIS 208 to AACS 206, AACS 206 determines the appropriate security policy for the device (as suggested by event or process (9)). The appropriate policy may depend upon multiple factors, characteristics, or parameter values;

8. Based on the determined security policy, AACS 206 provides information, such as a token, address, message or other form of instruction (as suggested by event or message 10) to client device 202. In some embodiments, this may be part of completing the SAML protocol between AACS 206 and device 202. The token, address, message or other form of instruction is provided by device 202 to host server 204 (as suggested by event or message 11) to implement the security policy for the device, and may include providing access to the requested application or service, preventing access to the requested application or service, or constraining some aspect of access to the requested application or service.

Note that by means of the token or other form of instruction, the security policy that is determined by the AACS and which will be applied is communicated to the client device—this may be in the form of a token embedded in a redirect URL, a redirection to an "access denied screen", a redirect to an application that controls access or limits access, etc.; and 9. Host server 204 then implements the security policy for device 202 by communicating with device 202 to initiate access, blocks or prevents access or constrains access to the requested application or service. This may include providing a login page, providing a message, etc. In some embodiments, (10) may include an access token identifying 202 and providing direct access to 204, or a URL with a token to redirect to a service that provides restricted or constrained access to the requested application or service.

With regards to determining the appropriate security policy, the Adaptive Access Control Service uses the information about the user, device and request described above and possibly other information (time of day, location, cloud service, application, etc.) to identify the appropriate security policy desired by the entity responsible for device 202. The appropriate policy may be determined by one of a set of rules, heuristics, or decision processes. In some embodiments, the Adaptive Access Control Service uses a "first match" process to choose the policy to apply. In this example, the choice or selection of policy may be based on a first detected match between the set of information (such as whether a device is managed or not, type of device, type of request) and a set of policy determining factors or "rules".

In other embodiments, multiple policies may be applied concurrently to increase flexibility and the granularity of possible policies (e.g., where more than one policy has some or all of the device/user/request data in common or where multiple policies are based on non-overlapping portions of the data). In other embodiments, a prioritization or ranking may be applied to device or session information to determine which characteristics or data need to be matched exactly to select a policy and in what order of preference. In other embodiments, multiple policies may be applied where each is based on different (non-overlapping) data and the outcomes of the rules do not conflict. In other embodiments, multiple policies may be applied where the policies have a common set of matched data but also include other data types whose values are not provided in the device/user/request data. For example, a combination of conditions/constraints may be applied by application of multiple "rules" with each rule "triggered" by the presence of different information (such as location, role of requestor, means of connection, etc.). In other embodiments, a larger set of rules may be used, where the set covers all possible combinations of factors considered when setting a security policy.

Figure 3:
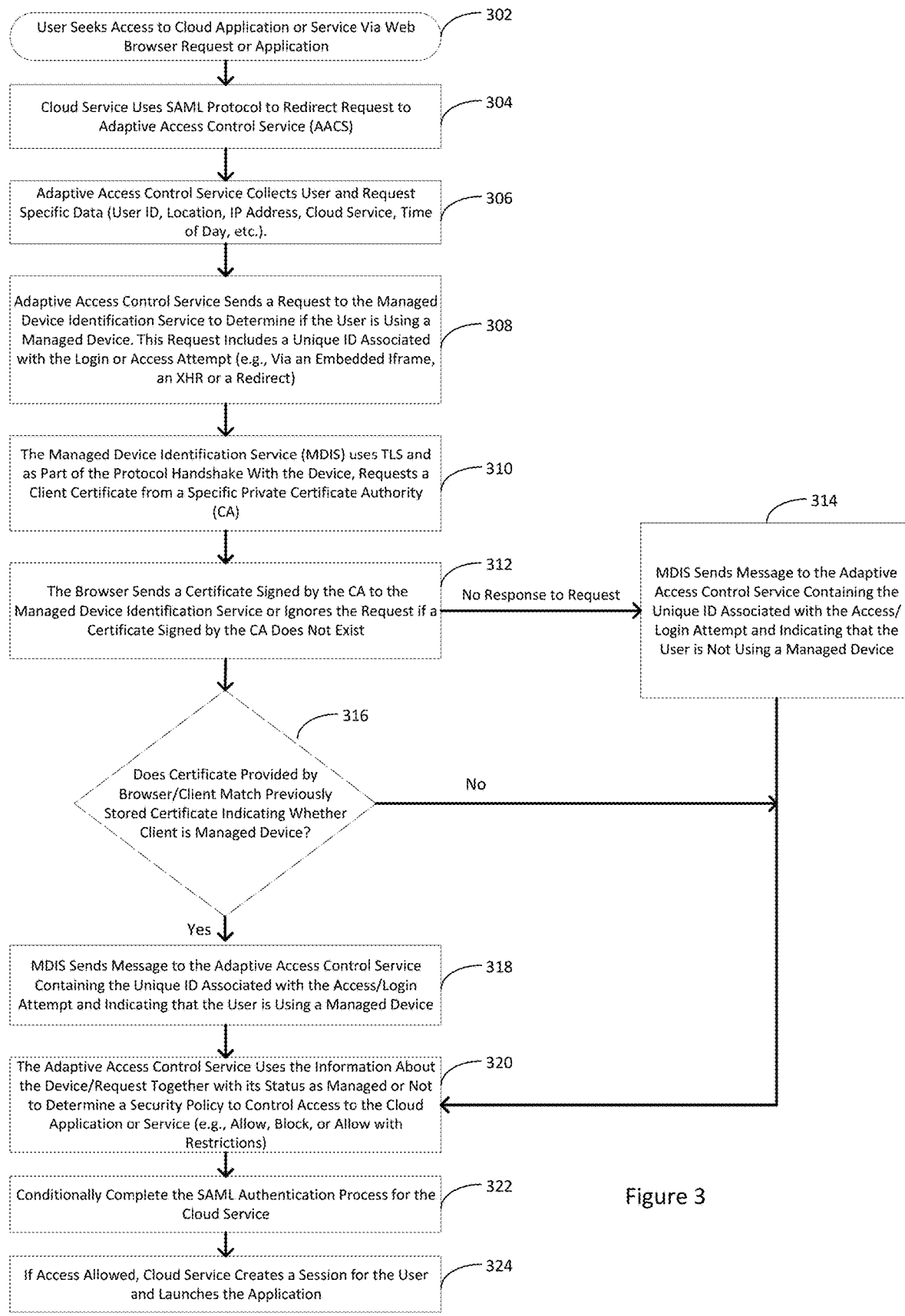
FIG. 3 is a flowchart or flow diagram illustrating a method, process, operation or function for determining the appropriate security to apply to a request to access an application or service by a client device, based at least in part on whether the device making the request is a managed device, in accordance with some embodiments of the system and methods described herein.

FIG. 3 is a flowchart or flow diagram illustrating a method, process, operation or function for determining whether a client device requesting a communication session is a managed device, and if it is, implementing a managed device security policy for the device, in accordance with an embodiment of the system and methods described herein. As shown in the figure, at step or stage 302, a user seeks to access a cloud-based application or service. This may be done by selecting an application icon on a device or using a web browser to navigate to a specific URL/website. As an example, the user may seek to access the application or service by sending a request generated by a browser or by selecting an installed application that initiates a login process. As examples, the application or service may be for purposes of messaging (email), document preparation, data processing, accessing specific data, using a specific application, system control, etc.

The cloud-based application or service receives the request for access and redirects the request to an authentication service, as suggested by step or stage 304. The redirection is typically performed in accordance with the SAML (or similar) protocol and the authentication service the request is redirected to typically depends on the domain of the sender. For example, a user will have an email address that includes a domain name and this domain name will be associated with a specific authentication server or service. In some embodiments, the authentication server or service is the AACS described herein.

At step or stage 306, the AACS server or service receives the request to access the application or service. The AACS collects a set of data that will be used in later stages of the overall process of determining and implementing an appropriate security policy for the user/device. The data collected may include, but is not limited to or required to include a user identification, a user/device location, a user/device IP address, the cloud-based service or application the user is requesting to access (such as a server URL), the time of day of the request, the network or network type used to make the request/connection (e.g., is the network known and an allowed VPN or alternatively, is the network known but is a disallowed network), etc. The information collected may be determined or modified by the operator of the AACS. In a situation where the AACS is operated as a SaaS service for multiple tenant accounts, the information collected may be determined by each tenant's criteria or factors for deciding upon a desired security policy.

After collecting the set of data, at step or stage 308 the AACS sends a message to the MDIS server or service. This message is a request or inquiry to determine if the user is using a managed device. As mentioned, a managed device is one that the user's employer or organization has provided to the user and that is expected to be used in accordance with a specific security policy determined by the employer or organization. As also mentioned, whether a device is a managed one or is not may be one factor in a plurality of factors that are used to determine the appropriate security policy. In some embodiments, the AACS and MDIS may be separate services or servers, while in some embodiments they may be two functional elements of a common service or server. The request to the MDIS may include a unique identification associated with the user's access request. This unique identification may take the form of an embedded Iframe, an XHR (XMLHttpRequest) or a redirect, as examples.

The MDIS sends a request for a certificate to the user's device, as suggested by step or stage 310. In some embodiments, the MDIS uses the TLS (transport layer security) protocol to request the certificate as part of the protocol handshake with the device. The certificate requested is one from a specific certificate authority (CA) and the request is to determine if the client device has stored or has access to such a certificate.

The device browser receives the request for the certificate from the MDIS as part of the TLS (or other suitable) protocol and either provides a certificate in response to the request or ignores the request if the device does not have the appropriate certificate, as suggested by step or stage 312. If no response is received by the MDIS to the request for the certificate, then the MDIS sends a message to the AACS informing the AACS that the user is not using a managed device, as suggested by step or stage 314. The message includes the unique identification associated with the user's access request. As will be described in greater detail with reference to step or stage 320, the AACS uses the information regarding whether the user device is managed or not to determine and implement the appropriate security policy.

If the client device provides a certificate to the MDIS, then the MDIS determines if the received certificate is the proper one by comparing it to a previously stored certificate that indicates if the device is a managed device, as suggested by step or stage 316. This comparison may be performed to determine if the received certificate matches the previously stored one, where the previously stored certificate may have been provided to the MDIS by an employer, organization or other owner of the device, or by a certificate authority in response to an authorization from the employer, etc.

If the comparison indicates that the certificate received from the device does not match the stored certificate, then control is passed to step or stage 320, as before when no response was received to the request from the MDIS to the device for a certificate. As mentioned with regards to that situation, the AACS uses the information regarding whether the user device is managed or not to determine the appropriate security policy. If the comparison indicates that the certificate received from the device matches the stored certificate, then a message is sent by the MDIS to the AACS informing the AACS that the user is using a managed device, as suggested by step or stage 318. The message includes the unique identification associated with the user's access request.

At step or stage 320, the AACS uses the information it has to determine the appropriate security policy for the user's request/device. In some embodiments, this information or data may include the information collected by the AACS at step or stage 306 in addition to an indication of whether the device is a managed device. Based on the information regarding the device, user, request, etc. and whether the device is a managed device, the AACS determines the appropriate security policy to apply and sets that as the security policy for the user's request. In some embodiments, determining the appropriate security policy may depend upon one or more rules or conditions. The rules or conditions may be set by the device owner, the user's employer, etc. The relationship between the information, the device being managed or not, and the applicable security policy may depend on a set of rules, a matrix or mapping from certain information or categories to a specific policy, the existence or absence of certain factors, etc.

As mentioned with regards to the description of FIG. 2, the Adaptive Access Control Service uses the information about the user, device and request and possibly other information (time of day, location, cloud service, application, etc.) to identify the appropriate security policy. The appropriate policy may be determined by one of a set of rules, heuristics, or decision processes. In some embodiments, the Adaptive Access Control Service uses a "first match" process to choose the policy to apply. In this example embodiment, the choice or selection of policy may be based on a first detected match between the set of information (such as whether a device is managed or not, type of device, type of request) and a set of policy requirements.

In other embodiments, multiple policies may be applied concurrently to increase flexibility and the granularity of possible policies (e.g., where more than one policy has some or all of the device/user/request data in common or where multiple policies are based on non-overlapping portions of the data). In other embodiments, a prioritization or ranking may be applied to device or session information to determine which characteristics or data need to be matched exactly to select a policy and in what order of preference. In other embodiments, multiple policies may be applied where each is based on different (non-overlapping) data and the outcomes of the rules do not conflict. In other embodiments, multiple policies may be applied where the policies have a common set of matched data but also include other data types whose values are not provided in the device/user/ request data. For example, a combination of conditions/ constraints may be applied by application of multiple "rules" with each rule "triggered" by the presence of different information (such as location, role of requestor, means of connection, etc.). In other embodiments, a larger set of rules may be used, where the set covers all possible combinations of factors considered when setting a security policy.

In general, the applied security policy will take one of three forms: allowance of the access request, denial (or ignoring) of the access request, or allowance but subject to a condition or further constraint or restriction. For example, a further restraint of condition may include a requirement of multi-factor authentication, restriction to use of certain types of encryption, restriction to certain types of network connections, a requirement to use a specific service for login, where the service provides limited access to a website or to specific features of a website, etc. After determination of the appropriate security policy, the authentication process that was initiated using the SAML protocol in step or stage 304 is conditionally completed, as suggested by step or stage 322. As part of this process, the device may present a token or other information received from the Adaptive Access Control Service to the host server. This informs the host server for the cloud-based application or service the user desires to access whether access is allowed and if any constraints or restrictions are placed on that access. If access is allowed, then the cloud-based service creates a session for the user and/or launches the requested application, as suggested at step or stage 324.

In some embodiments, the information received by the device from the Adaptive Access Control Service may be a URL or other form of address to (re)direct the device to a server other than the host server. This may be done as part of implementing a security policy that restricts or conditions certain features of the requested application or service.

In some embodiments, the stored certificate or other form of data record that identifies one or more client devices as managed devices may be a single certificate that is used for more than one client device that is managed by an organization or company. In this example, the same security policy would be applied to all managed devices of the organization.

In another example, the managed devices for an organization may be separated into groups, with each group intended to be the subject of a different security policy. In these examples a flag, bit setting, or data value in a field of an exchanged certificate may be used to identify a managed device and/or to specify the appropriate security policy. If the flag, bit, or data are used to specify a particular security policy, then the server may refer to a database, list, index, or other form of providing an association between the flag, bit, or data and a specific policy to interpret the flag, bit, or data and identify the appropriate security policy.

In one embodiment, a specific security policy may be applied to all managed devices belonging to a set of users. The set of users may be a subset of the employees of a corporation or members of an organization. The set of users may have a common relationship or characteristic. The common relationship or characteristic may be having a similar risk level or risk profile, working in the same department, performing a similar type of task, having a similar role, or having a similar seniority level in a company.

As mentioned, in some embodiments, the MDIS is configured to request a client device certificate as part of a handshake protocol. This may be implemented by any suitable technique, including but not limited to (or requiring) use of the TLS handshake protocol (which supports a feature for the server to request a Client Certificate), a browser setting or other suitable method. For example, the TLS protocol may be configured to cause the server to transmit a CertificateRequest and a CertificateAuthoritiesExtension containing the distinguished name of the certificate authority (CA) used to create the certificate that a managed client will provide.

As an example of the implementation of this function, the TLS handshake protocol supports a feature for the server to request a Client Certificate. Standard web browsers support this request and can be configured to provide a preinstalled certificate to complete the handshake. Once the MDIS server receives a certificate, it can be compared to a certificate stored on the server (or within the service infrastructure), thereby determining the client to be identified as a managed device. If the browser lacks a matching certificate, (i.e., does not respond or provides a certificate that doesn't match), then the MDIS server determines the client is an unmanaged device without interfering with the handshake process or the remainder of the communication.

The described solution can use a single CA (Certificate Authority) Certificate for one, multiple, or all clients of the authentication service, depending on requirements. Each organization should use a single dedicated Client Certificate that is signed by the matching CA, although multiple Client Certificates can be used to provide finer controls.

The steps or stages that may be used to implement such a solution include:

1. Create a CA Private key and Root Certificate;
2. Configure a web server—the MDIS in this case—to use the TLS protocol and to transmit a CertificateRequest and a CertificateAuthoritiesExtension containing the Distinguished Name of the CA (#1). This is further described in the TLS Protocol spec;
3. Create a Client Certificate signed by the CA (#1) and configure the system or browser to use the certificate when accessing or responding to the handshake protocol initiated by the MDIS; and
4. Upon connection, the MDIS extracts the certificate provided in the handshake, compares it to the stored certificate and based on the comparison, determines the appropriate security policy.

Figure 4:
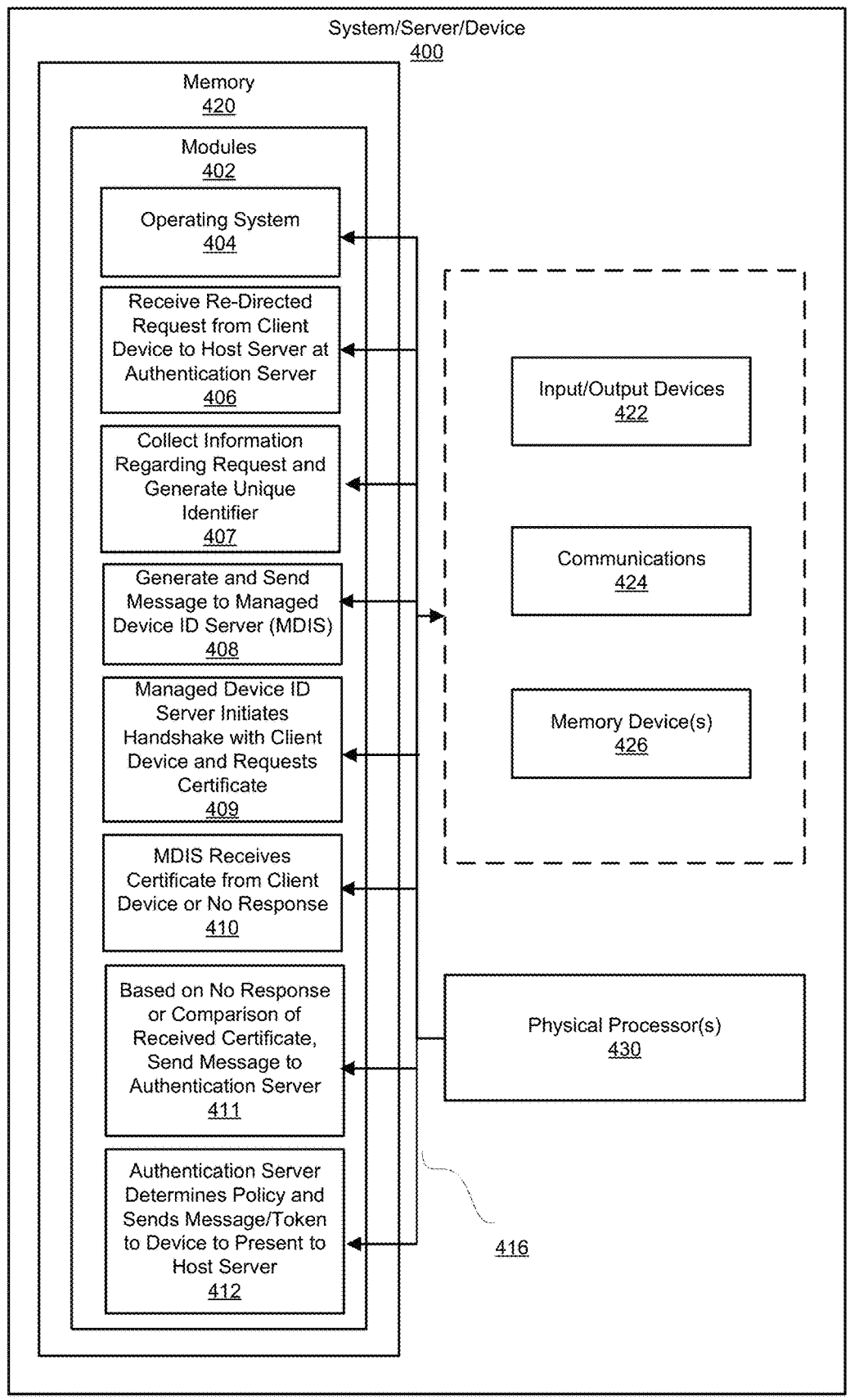
FIG. 4 is a diagram illustrating elements or components that may be present in a computer device or system configured to implement a method, process, function, or operation in accordance with some embodiments of the system and methods described herein.

FIG. 4 is a diagram illustrating elements or components that may be present in a computing device, server, or system 400 configured to implement a method, process, function, or operation in accordance with an embodiment of the invention. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform. As should be evident, certain of the functions or operations are performed by the client device, with others performed by one or more of the host server, authentication server (AACS), and device identification server (MDIS).

Each application module or sub-module may correspond to a specific function, method, process, or operation that is implemented by the module or sub-module. Such function, method, process, or operation may include those used to implement one or more aspects of the disclosed system and methods, such as for:

receiving a request at a (host) server from a client device to access an application or service;

based on the domain of the requesting entity, redirecting the request to an authentication server (the AACS described herein), the authentication server configured to:

identify and collect information regarding one or more of the client device, the user, and the request (such as device ID or type, requested service or application, user role, networks used for request, etc.);

generate a unique identifier associated with the request; and generate and send a message to a device identification service (the MDIS described herein), the message including the unique identifier and a request or inquiry as to whether the client device is a managed device;

receive the message from the authentication server (AACS) at the device identification service (MDIS) and in response, initiate a handshake protocol with the client device, where as part of the handshake, the device identification service;

requests a certificate from the client device, where the certificate is signed by a specific certificate authority (CA);

the client device browser receives the request from the device identification service, and in response either;

returns a signed certificate to the device identification service; or ignores the request and does not return a response;

operate the device identification service to compare a certificate received from the client to a previously stored valid certificate for the client device;

if the received certificate matches a known valid certificate, then generate and send a message from the device identification service to the authentication server containing the unique identifier and an indication that the client device is a managed device;

if either the received certificate does not match a known valid certificate, or the client device browser receives the request from the device identification service and does not return a response, then operate the device identification service to send a message to the authentication server containing the unique identifier and an indication that the client device is not a managed device;

operate the authentication server to determine the appropriate security policy based on the collected information regarding the client device, user, and request, and whether the client device is a managed device or is not a managed device;

where if the client device is a managed device, the security policy may include one or more of:

use of multi-factor authorization (MFA) to access specific websites, applications, or data sources;

allow specific websites, block specific websites, or disallow specific websites;

restricting functionality of webpages or applications; and limiting access to company networks or systems from certain locations or over certain types of networks;

based on the determined security policy, operate the authentication server to provide a message or token to the client device for presentation to the (host) server; and the message or token is then presented by the device to the (host) server to complete the authentication protocol and determine if the device can access the requested application or service.

Note that in addition to (or as an alternative to) the architecture and processes described herein, embodiments may include a combined MDIS and AACS—this may provide architectural simplicity but as a tradeoff, reduces architectural flexibility.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As shown in FIG. 4, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

As also mentioned, certain of the operations or functions performed as a result of the execution of the instructions contained in the modules may be the result of one or more of a client device, authentication server (the AACS), a device ID server (the MDIS), or a host server executing the instructions. Thus, although FIG. 4 illustrates a set of modules which taken together perform multiple functions or operations, these functions or operations may be performed by different devices or system elements, with certain of the modules being associated with those devices or system elements.

As shown in the figure, modules 402 may contain one or more sets of instructions for performing a method or function described with reference to FIGS. 2 and 3. These modules may include those illustrated but may also include a greater number or fewer number than those illustrated. Further, the computer-executable instructions that are contained in the modules may be executed by the same or by different processors. For example, certain of the sets of instructions may be executed by an authentication server (such as the AACS described herein), while other of the instructions may be executed by the managed device identification server (the MDIS described herein). Thus, in some embodiments, the AACS and MDIS may be part of the same system or platform, or otherwise in communication with each other.

As an example, Receive Re-Directed Request from Client Device to Host Server at Authentication Server Module 406 may contain instructions that when executed perform a process to receive a request from a client device to access an application or service that has been re-directed from a host server. Collect Information Regarding Request and Generate Unique Identifier Module 407 may contain instructions that when executed perform a process to process the received request and identify specific information related to the request, user, device, etc. and also to generate a unique identifier for the request. In some embodiments, the specific information may be that used as part of determining an appropriate security policy. Generate and Send Message to Managed Device ID Server Module 408 may contain instructions that when executed perform a process to send a message or request to a managed device ID server to determine if the device is a managed device. The message may include the unique identifier.

Managed Device ID Server Initiates Handshake with Client Device and Requests Certificate Module 409 may contain instructions that when executed perform a process to cause the managed device ID server to initiate a handshake protocol (such as by using TLS) between the server and the client device. The handshake includes a request to the device to provide a signed certificate. The client will either respond by providing a certificate or ignore the request. Receive Certificate from Client Device or No Response Module 410 may contain instructions that when executed perform a process to cause the managed device ID server to receive a certificate from the device as part of the handshake or to determine that no response was received from the client. Based on No Response or Comparison of Received Certificate, Send Message to Authentication Server Module 411 may contain instructions that when executed perform a process to cause the managed device ID server to generate and send a message to the AACS or authentication server that contains the unique identifier and an indication of whether the device is a managed device. Authentication Server Determines Policy and Sends Message/Token to Device to Present to Host Server Module 412 may contain instructions that when executed perform a process to cause the authentication server to determine the appropriate policy and communicate that policy to the device (e.g., by means of a message or token). The device receives the message or token and send it to the host server. The host server then responds to the device's request in a manner that implements the determined security policy.

Figure 5:
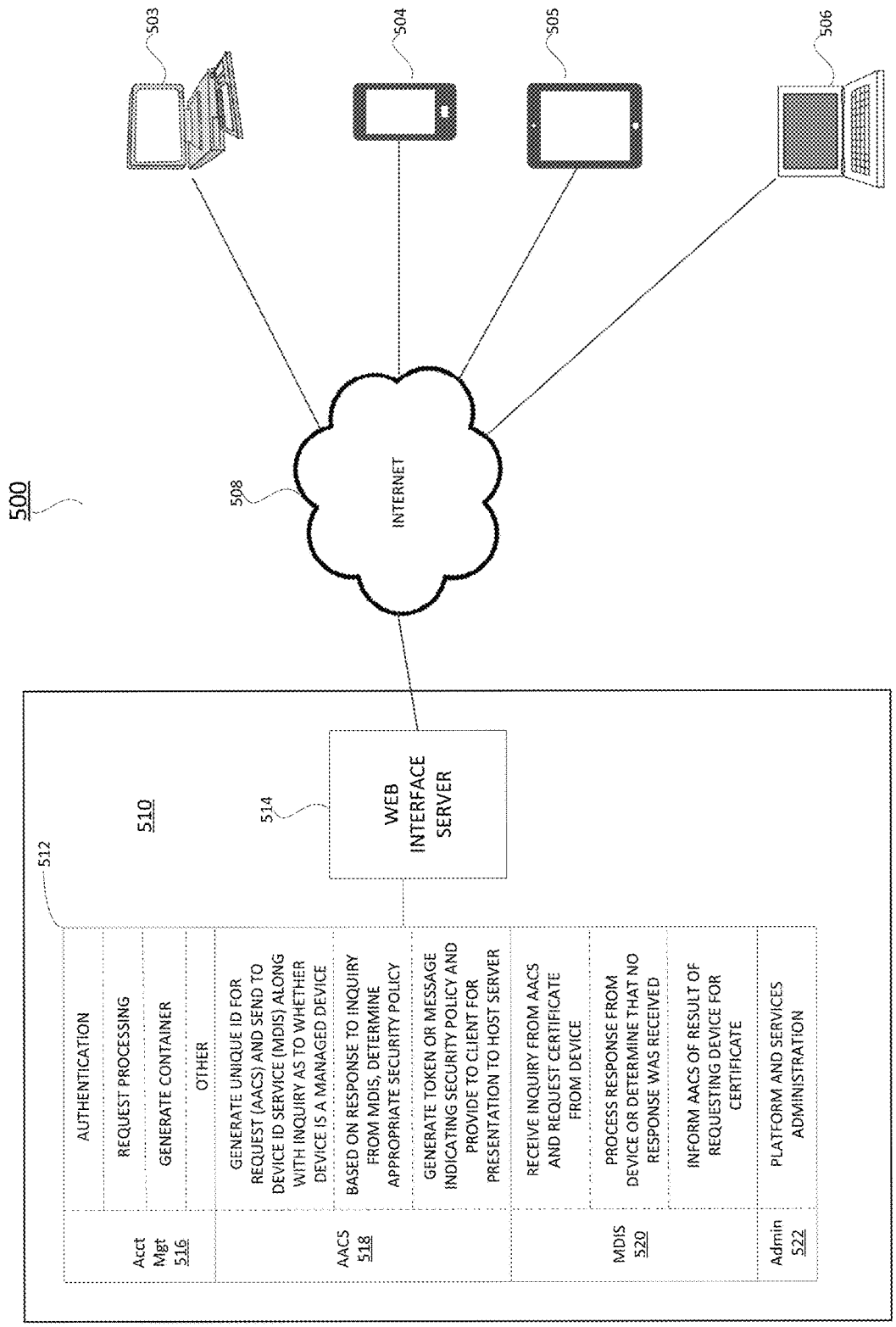
FIGS. 5-7 are diagrams illustrating an architecture for a multi-tenant or SaaS platform that may be used in implementing some embodiments of the system and methods described herein.
Figure 6:
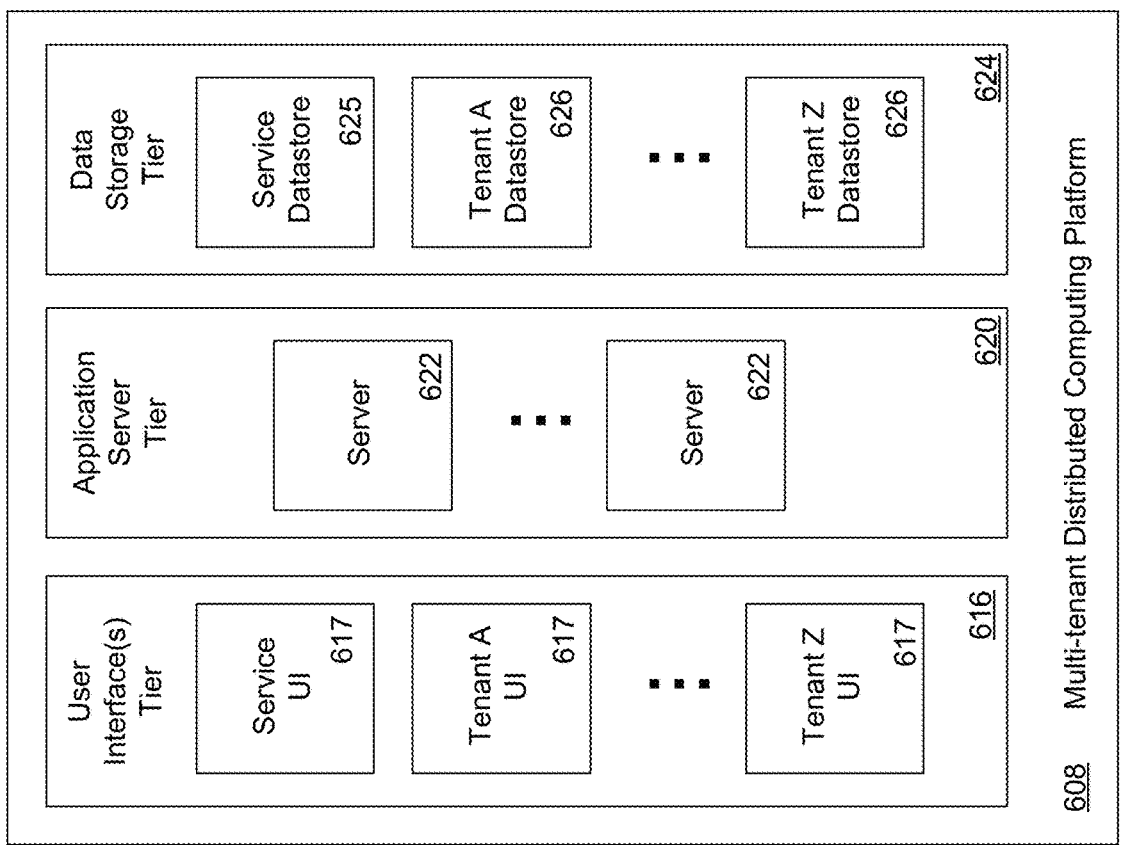
Figure 6:
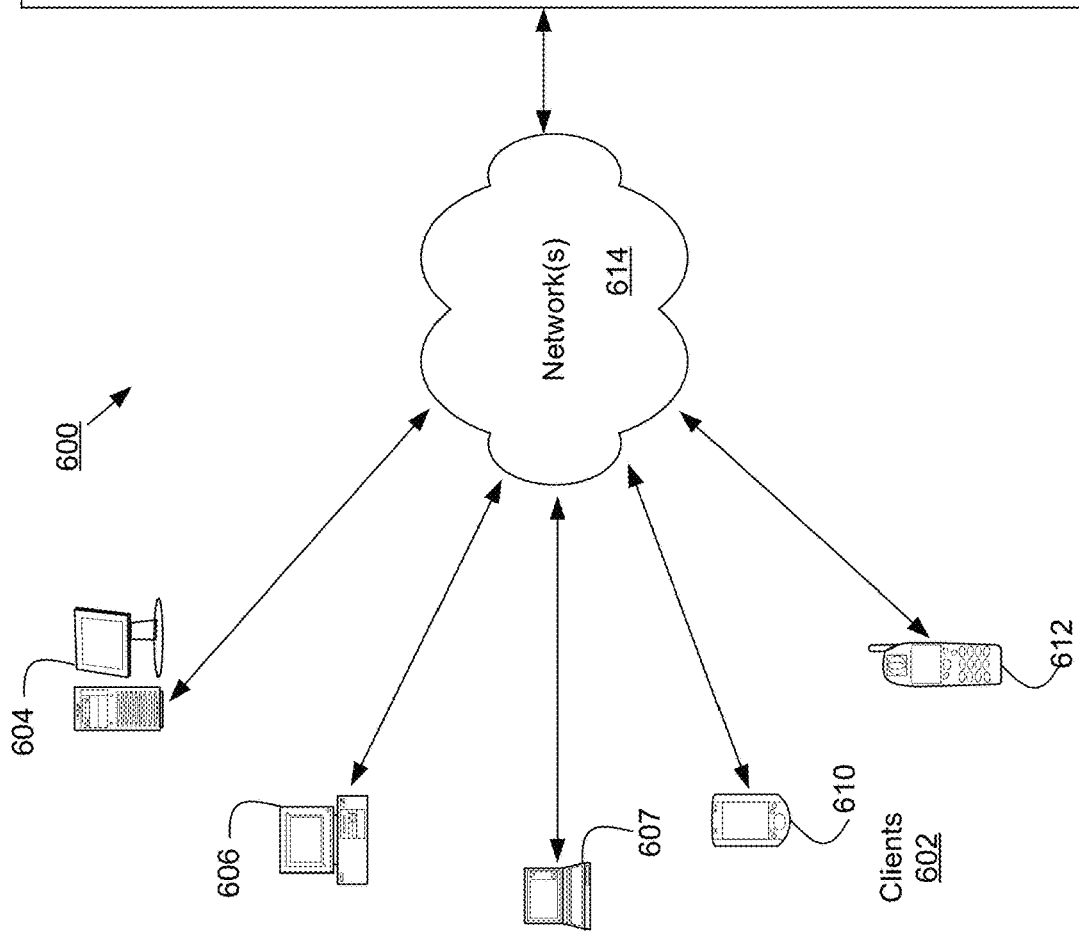
Figure 7:
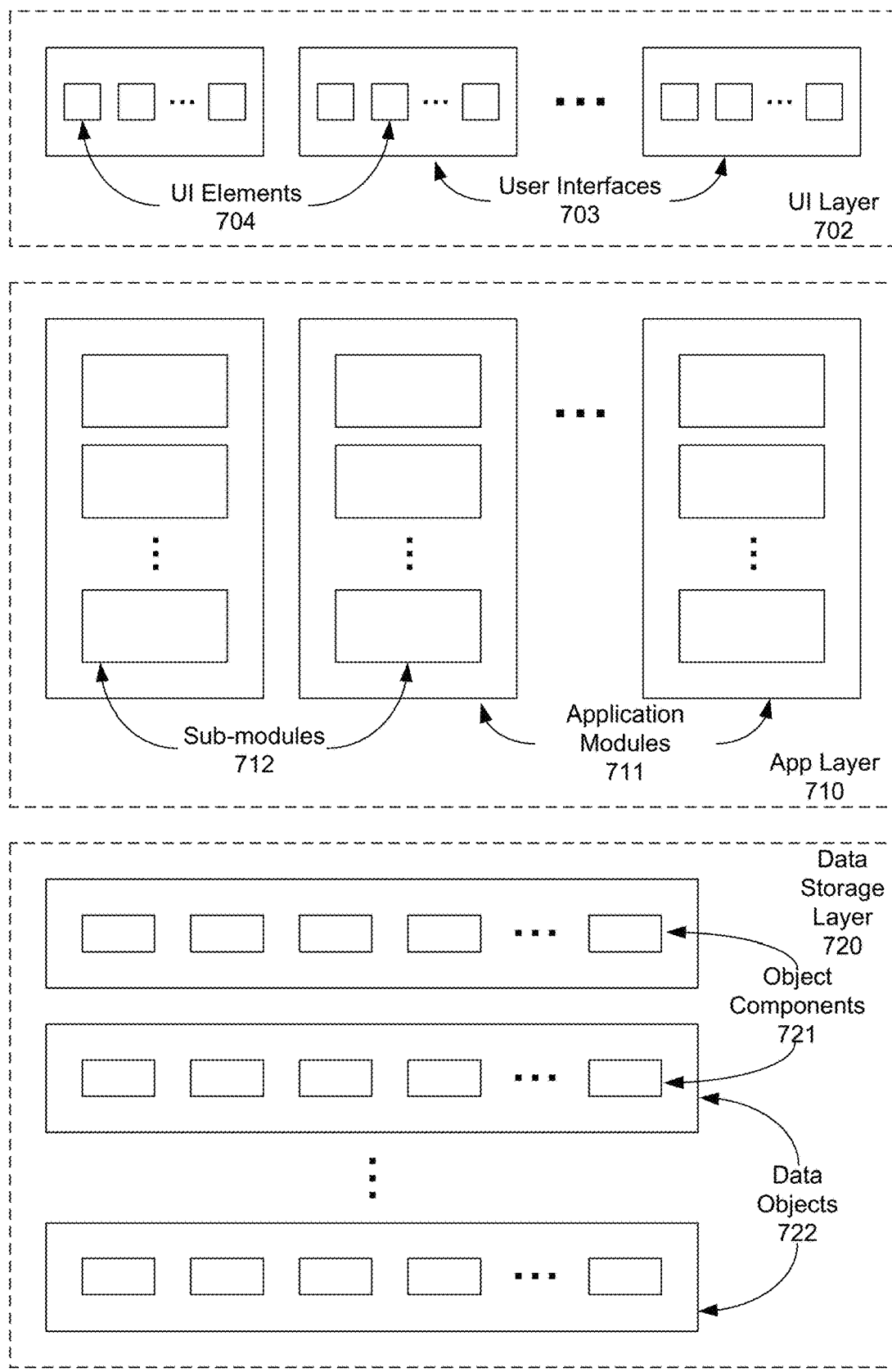

In some embodiments, the functionality and services provided by the system and methods described herein may be made available to multiple users (where in this context, a user may be an individual, a business, or an organization), with each user having an account maintained by a server or server platform. Such a server or server platform may be termed a form of Software-as-a-Service (SaaS). FIG. 5 is a diagram illustrating a SaaS system, including an integrated business system and an enterprise network in which an embodiment of the invention may be implemented. FIG. 6 is a diagram illustrating elements or components of an example operating environment in which an embodiment of the invention may be implemented. FIG. 7 is a diagram illustrating additional details of the elements or components of the multi-tenant distributed computing service platform of FIG. 6, in which an embodiment of the invention may be implemented.

In some embodiments, the system or service described herein to apply a desired security policy to a managed device may be implemented as micro-services, processes, workflows or functions performed in response to the submission by a device of a request to access a service or application on a host server. The micro-services, processes, workflows or functions may be performed by a server, data processing element, platform, or system. In some embodiments, the service to apply a desired security policy to a managed device may be provided by a service platform located "in the cloud". In such embodiments, the platform is accessible through APIs and SDKs. The application of the appropriate managed device security policy may be provided as a micro-service within the platform. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to determine and apply a desired security policy to a managed device. Although in some embodiments, a platform or system of the type illustrated in FIGS. 5-7 may be operated by a 3rd party provider to provide a specific set of business-related applications, in other embodiments, the platform may be operated by a provider and a different business may provide the applications or services for users through the platform. For example, in the context of the present application, such an architecture may be used to provide email analysis and filtering services, network cybersecurity services, risk evaluation services, employee segmentation services, risk remediation services, management of a set of devices, etc. through access to one or more applications or services.

Each account may correspond to a separate user, corporation, or organization. In some examples, each account may correspond to a subset of the employees of a corporation or members of an organization. Each account may be associated with a set of users and devices, with each account also associated with a specific security policy for those devices. The set of users may have a common relationship or characteristic. The common relationship or characteristic may be having a similar risk level or risk profile, working in the same department, performing a similar type of task, having a similar role, or having a similar seniority level in a company.

FIG. 5 is a diagram illustrating a system 500 in which an embodiment of the invention may be implemented or through which an embodiment of the services described herein may be accessed. In accordance with the advantages of an application service provider (ASP) hosted business service system (such as a multi-tenant data processing platform), users of the services described herein may comprise individuals, businesses, stores, organizations, etc. A user may access the services using any suitable client, including but not limited to desktop computers, laptop computers, tablet computers, scanners, smartphones, etc. Users interface with the service platform across the Internet 508 or another suitable communications network or combination of networks. Examples of suitable client devices include desktop computers 503, smartphones 504, tablet computers 505, or laptop computers 506.

Managed device security policy system 510, which may be hosted by a third party, may include a set of device security policy services 512 and a web interface server 514, coupled as shown in FIG. 5. It is to be appreciated that either or both of the services 512 and the web interface server 514 may be implemented on one or more different hardware systems and components, even though represented as singular units in FIG. 5. Services 512 may include one or more functions or operations for the processing of requests from devices to determine and implement an appropriate security policy.

As examples, in some embodiments, the set of applications, functions, operations or services made available through the platform or system 510 may include:

account management services 516, such as a process or service to authenticate a user (such as a business or organization) wishing to implement a security policy for one or more managed devices;

a process or service to receive a redirected request from a client device to access a service or application on a host server and to process the request to extract information regarding the device, the user, and the request that will be used by the AACS to generate a unique ID;

a process or service to generate a container or instantiation of the managed device security policy processes for the subject request or requests; or other forms of account management services.

AACS processes or services 518, such as a process or service to generate a unique identifier for the request by the AACS and to pass that ID and an inquiry as to whether the device is a managed device to a managed device ID service (MDIS);

a process or service to receive from the MDIS an indication of whether the device is a managed device and in response to determine the appropriate security policy for the device/request;

a process or service to generate a token or message indicating the appropriate security policy to apply to the device/request; and a process or service to provide the generated token or message to the device for presentation to the host server;

MDIS processes and services 520, such as a process or service to receive the inquiry from the AACS and to request a certificate from the device;

a process or service to receive a response from the device and compare the received certificate to a previously stored certificate;

a process or service to determine that no response has been received from the device;

a process or service to communicate with the AACS and inform that service of the result of the request from the MDIS to the device for the certificate; either that the device is a managed device or that it is not a managed device; and administrative services 522, such as a process or services to enable the provider of the managed device security policy services to modify the decision process for determining the appropriate security policy, the format or contents of the token or message generated by the AACS and provided to the client, etc.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity in order to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

Rather than build and maintain such a platform or system themselves, a business may utilize systems provided by a third party. A third party may implement a business system/platform as described above in the context of a multi-tenant platform, where individual instantiations of a business' data processing workflow (such as the managed device security policy services described herein) are provided to users, with each business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The application layer 710 may include one or more application modules 711, each having one or more sub-modules 712. Each application module 711 or sub-module 712 may correspond to a function, method, process, or operation that is implemented by the module or sub-module (e.g., a function or process related to determining and implementing a security policy for a device for a user of the platform). Such function, method, process, or operation may include those used to implement one or more aspects of the inventive system and methods, such as for one or more of the processes or functions described with reference to FIGS. 2, 3, 4, and 5:

a process or service to authenticate a user (such as a business or organization) wishing to implement a security policy for one or more managed devices;

a process or service to receive a redirected request from a client device to access a service or application on a host server and to process the request to extract information regarding the device, the user, and the request that will be used by the AACS to generate a unique ID;

a process or service to generate a container or instantiation of the managed device security policy processes for the subject request or requests; or a process or service to generate a unique identifier for the request by the AACS and to pass that ID and an inquiry as to whether the device is a managed device to a managed device ID service (MDIS);

a process or service to receive the inquiry from the AACS at the MDIS and to request a certificate from the device;

a process or service to receive a response from the device at the MDIS and compare the received certificate to a previously stored certificate;

a process or service to determine that no response has been received from the device;

a process or service to communicate with the AACS and inform that service of the result of the request from the MDIS to the device for the certificate;

a process or service to receive from the MDIS at the AACS an indication of whether the device is a managed device and in response to determine the appropriate security policy for the device/request;

a process or service to generate a token or message indicating the appropriate security policy to apply to the device/request;

a process or service to provide the generated token or message to the device for presentation to the host server; and a processor services to enable the provider of the managed device security policy services to modify the decision process for determining the appropriate security policy, the format or contents of the token or message generated by the AACS and provided to the client, etc.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further example environments in which an embodiment of the invention may be implemented in whole or in part include devices (including mobile devices), software applications, systems, apparatuses, networks, SaaS platforms, IaaS (infrastructure-as-a-service) platforms, NaaS (network-as-a-service) platforms, or other configurable components that may be used by multiple users for data entry, data processing, application execution, or data review.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as Python, Java, JavaScript, C++ or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method of implementing a desired security policy for a device, comprising:
    receiving, at an authentication service, a request from a device to access an application or service on a host server;
    operating the authentication service to generate a unique identifier for the request;
    operating the authentication service to provide the unique identifier to a managed device service;
    operating the managed device service to send a certificate request and an identification of a certificate authority to the device, wherein the certificate request and certificate authority correspond to a certificate and authority for a managed device;
    receiving, at the managed device service, a certificate provided by the device or receiving no response from the device;
    if a certificate is received from the device, then operating the managed device service to determine if it is a valid certificate, wherein determining if the received certificate is a valid certificate further comprises operating the managed device service to compare the received certificate to a previously stored certificate;
    if the received certificate is a valid certificate, then operating the managed device service to generate a message containing the unique identifier and an indication that the client device is a managed device, wherein the managed device is an agentless managed device;
    if the received certificate is not a valid certificate or if no response is received to the request for a certificate from the device, then operating the managed device service to generate a message containing the unique identifier and an indication that the client device is not a managed device;
    operating the managed device service to send the generated message to the authentication service;
    operating the authentication service to determine a security policy for the request from the device based on whether the device is a managed device or is not a managed device;
    operating the authentication service to generate information about the determined security policy; and
    operating the authentication service to send the information about the determined security policy to the device, wherein the information directs the device to a destination that implements the determined security policy.

2. The method of claim 1, wherein the unique identifier is generated, at least in part, based on one or more of a user account name or address, an identifier for the application or service on the host server, an address of the host server, a date or time of the request, a type of connection used to make the request, and a location of the device.

3. The method of claim 1, wherein the certificate request and identification of a certificate authority are sent to the device by the managed device service as part of a protocol handshake.

4. The method of claim 1, wherein operating the authentication service to determine the security policy for the request from the device further comprises determining that the security policy is one or more of requiring multi-factor authentication to access specific websites, applications, or data sources, allowing, blocking or disallowing specific websites, restricting functionality of webpages or applications, and limiting access to company networks or systems from certain locations or over certain types of networks if the device is a managed device.

5. The method of claim 1, wherein the previously stored certificate is for use with a plurality of devices.

6. The method of claim 1, wherein the information about the determined security policy is a token or a message.

7. The method of claim 6, wherein the token or message directs the device to one of the host server, a webpage, or a different server.

8. The method of claim 5, wherein each of the plurality of devices are used by a person who is an employee of a specific company or member of a specific organization.

9. The method of claim 1, wherein the security policy is determined by one or more rules, wherein the one or more rules include consideration of whether the device is a managed device and at least some data used to generate the unique identifier.

10. A system to implement a desired security policy for a device, comprising:
    one or more electronic processors configured to execute a set of instructions; and
    a memory to store the set of instructions, wherein when executed, the set of instructions cause the one or more electronic processors to implement
    an authentication service, wherein the authentication service operates to receive a request from a device to access an application or service on a host server;
    generate a unique identifier for the request; and
    provide the unique identifier to a managed device service; and
    the managed device service, wherein the managed device service operates to send a certificate request and an identification of a certificate authority to the device, wherein the certificate request and certificate authority correspond to a certificate and authority for a managed device;
    receive a certificate provided by the device or receive no response from the device;
    if a certificate is received from the device, then determine if it is a valid certificate, wherein determining if the received certificate is a valid certificate further comprises the managed device service comparing the received certificate to a previously stored certificate;

if the received certificate is a valid certificate, then generate a message containing the unique identifier and an indication that the client device is a managed device, wherein the managed device is an agentless managed device;

if the received certificate is not a valid certificate or if no response is received to the request for a certificate from the device, then generate a message containing the unique identifier and an indication that the client device is not a managed device;

send the generated message to the authentication service;

wherein the authentication service further operates to determine a security policy for the request from the device based on whether the device is a managed device or is not a managed device;

generate information about the determined security policy; and send the information about the determined security policy to the device, wherein the information directs the device to a destination that implements the determined security policy.

11. The system of claim 10, wherein the unique identifier is generated, at least in part, based on one or more of a user account name or address, an identifier for the application or service on the host server, an address of the host server, a date or time of the request, a type of connection used to make the request, and a location of the device.

12. The system of claim 10, wherein the certificate request and identification of a certificate authority to the device are sent to the device by the managed device service as part of a protocol handshake.

13. The system of claim 10, wherein determining the security policy for the request from the device further comprises determining that the security policy is one or more of requiring multi-factor authentication to access specific websites, applications, or data sources, allowing, blocking or disallowing specific websites, restricting functionality of webpages or applications, and limiting access to company networks or systems from certain locations or over certain types of networks if the device is a managed device.

14. The system of claim 10, wherein the previously stored certificate is for use with a plurality of devices.

15. The system of claim 10, wherein the information about the determined security policy is a token or a message, and further, wherein the token or message directs the device to one of the host server, a webpage, or a different server.

16. A set of one or more non-transitory computer-readable media comprising a set of computer-executable instructions that when executed by one or more programmed electronic processors, cause the processors to receive a request from a device to access an application or service on a host server;

send a certificate request and an identification of a certificate authority to the device, wherein the certificate request and the certificate authority correspond to a certificate and authority for a managed device;

receive a certificate provided by the device or receive no response from the device;

if a certificate is received from the device, then determine if it is a valid certificate, wherein determining if the received certificate is a valid certificate further comprises the managed device service comparing the received certificate to a previously stored certificate;

if the received certificate is a valid certificate, then generate a message containing an indication that the device is a managed device, wherein the managed device is an agentless managed device;

if the received certificate is not a valid certificate or if no response is received to the request for a certificate from the device, then generate a message containing an indication that the device is not a managed device;

send the generated message to a process to determine a security policy for the request from the device;

determine a security policy for the request from the device based on whether the device is a managed device or is not a managed device;

generate information about the determined security policy; and send the information about the determined security policy to the device, wherein the information directs the device to a destination that implements the determined security policy.

17. The set of one or more non-transitory computer-readable media of claim 16, wherein the certificate request and identification of a certificate authority to the device are sent to the device as part of a protocol handshake.

18. The set of one or more non-transitory computer-readable media of claim 16, wherein determining the security policy for the request from the device further comprises determining that the security policy is one or more of requiring multi-factor authentication to access specific websites, applications, or data sources, allowing, blocking or disallowing specific websites, restricting functionality of webpages or applications, and limiting access to company networks or systems from certain locations or over certain types of networks if the device is a managed device.

19. The system of claim 14, wherein each of the plurality of devices are used by a person who is an employee of a specific company or member of a specific organization.

20. The system of claim 10, wherein the security policy is determined by one or more rules, wherein the one or more rules include consideration of whether the device is a managed device and at least some data used to generate the unique identifier.

21. The set of one or more non-transitory computer-readable media of claim 16, wherein the unique identifier is generated, at least in part, based on one or more of a user account name or address, an identifier for the application or service on the host server, an address of the host server, a date or time of the request, a type of connection used to make the request, and a location of the device.

22. The set of one or more non-transitory computer-readable media of claim 16, wherein the previously stored certificate is for use with a plurality of devices.

23. The set of one or more non-transitory computer-readable media of claim 16, wherein the information about the determined security policy is a token or a message, and further, wherein the token or message directs the device to one of the host server, a webpage, or a different server.

24. The set of one or more non-transitory computer-readable media of claim 22, wherein each of the plurality of devices are used by a person who is an employee of a specific company or member of a specific organization.

25. The set of one or more non-transitory computer-readable media of claim 16, wherein the security policy is determined by one or more rules, wherein the one or more rules include consideration of whether the device is a managed device and at least some data used to generate the unique identifier.

* * * * *